United States Patent
Li et al.

(10) Patent No.: US 7,472,344 B2
(45) Date of Patent: Dec. 30, 2008

(54) DEVICE AND METHOD FOR GENERATING METADATA FROM ESSENCE

(75) Inventors: Hui Li, Hannover (DE); Meinolf Blawat, Hannover (DE); Uwe Janssen, Seelze (DE); Stefan Kubsch, Hohnhorst (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 202 days.

(21) Appl. No.: 10/761,828

(22) Filed: Jan. 20, 2004

(65) Prior Publication Data

US 2004/0153474 A1    Aug. 5, 2004

(30) Foreign Application Priority Data

Jan. 21, 2003    (EP) .................... 03001175

(51) Int. Cl.
    *G06F 17/00*    (2006.01)
(52) U.S. Cl. ...................... 715/234; 715/243
(58) Field of Classification Search ............. 715/517, 715/513, 205, 208, 234, 243
    See application file for complete search history.

(56) References Cited

U.S. PATENT DOCUMENTS

| 6,055,543 | A | 4/2000 | Christensen et al. ........ 707/104 |
| 6,353,823 | B1 | 3/2002 | Kumar .......................... 707/3 |
| 2002/0135621 | A1 | 9/2002 | Angiulo et al. ............. 345/838 |
| 2002/0167683 | A1* | 11/2002 | Hanamoto et al. ......... 358/1.14 |
| 2004/0001106 | A1* | 1/2004 | Deutscher et al. ........... 345/838 |
| 2004/0024662 | A1* | 2/2004 | Gray et al. .................... 705/29 |
| 2005/0182777 | A1* | 8/2005 | Block et al. ................. 707/100 |
| 2006/0053077 | A1* | 3/2006 | Mourad et al. ................ 705/51 |

OTHER PUBLICATIONS

Handschuh, Siegfried, et al, "Languages & Authoring for the Semantic Web: Authoring and Annotation of Web Pages in CREAM", Proceedings of the 11th International Conference on World Wide Web, May 2002, pp. 462-473.*
DeRoure, David C., et al, "Investigating Link Service Infrastructures", Proceedings of the Eleventh ACM on Hypertext and Hypermedia, May 2000, pp. 67-76.*
PCT Search Report Dated Mar. 7, 2003.

* cited by examiner

*Primary Examiner*—Laurie Ries
(74) *Attorney, Agent, or Firm*—Joseph J. Laks; Harvey D. Fried; Joel M. Fogelson

(57) ABSTRACT

The generation of metadata shall be simplified. Therefore, a method is presented in which a metadata-template is filled with selected essence and MD-links obtained from a list of links to essence and/or a list of current metadata. Furthermore, it is possible to obtain the MD-links from further metadata or essences directly or indirectly linked with the selected essence.

10 Claims, 2 Drawing Sheets

DEVICE AND METHOD FOR GENERATING METADATA FROM ESSENCE

This application claims the benefit under 35 U.S.C. § 119 of EPO Application No. 03001175.3 filed on Jan. 21, 2003.

FIELD OF THE INVENTION

The present invention relates to a method for processing multimedia data including the step of providing at least one selected essence data, wherein essence data represents information being directly perceptible by a user. Furthermore, the present invention relates to a corresponding device for processing multimedia data.

BACKGROUND OF THE INVENTION

Multimedia data may include metadata being data about data. Metadata is a special kind of data, which is linked to other data called essence. Metadata is typically used as index message for essence. Essence is the basic data, such as text essence, picture essence, video essence, or audio essence.

The metadata structure is essentially characterized by two parts: metadata-essence (MD-essence) and metadata-link (MD-link). MD-essence is part of a metadata, which is designed to be human-perceptible, and which serves as the proxy by which the metadata will be presented to the user in any user interface of systems employing metadata. MD-link is part of the metadata, which links to any kind of essence.

A way how to generate efficient metadata is always an important issue for metadata applications. A possible way for generating metadata is to convert essence into metadata. In practice, some essence, such as text essence or thumbnail picture essence, contains a lot of compact information which can be utilized for metadata. Usually, content of essence can be converted directly into metadata essence. However, it is a problem to generate MD-link data conveniently in case of conversion of essence into metadata.

SUMMARY OF THE INVENTION

In view of that it is the object of the present invention to provide a device and a method for conveniently generating MD-link data, while generating metadata from essence.

According to the present invention this object is solved by a method for processing multimedia data including the steps of providing at least one selected essence data, wherein essence data represents information being directly perceptible by a user, providing a metadata template to be used to form at least a first metadata, providing a list of links to a plurality of second essence data and/or a list of a plurality of second metadata and forming said at least first metadata on the basis of said at least one selected essence data and said list of links and/or said list of second metadata by applying said metadata template.

Furthermore, according to the present invention there is provided a device for processing multimedia data including first storing means for providing at least one selected essence data, wherein essence data represents information being directly perceptible by a user, second storing means for providing a metadata-template to be used to form at least a first metadata, third storing means for providing a list of links to a plurality of second essence data and/or a list of a plurality of second metadata and processing means connected to that first, second and third storing means for forming said at least first metadata on the basis of said at least one selected essence data and said list of links and/or said list of second metadata by applying said metadata-template.

Accordingly, there is provided a basic method and device for conversion of essence into metadata for users with pre-knowledge for generating MD-links. Additionally, there may be provided an advanced method for convertion of essence into metadata based on a relationship-chain between essence and metadata, wherein the user may be without any pre-knowledge for generating MD-links efficiently. In other words, the user is given an intelligent metadata editing method or an assistant tool for metadata editing.

Preferably, second metadata linked with the at least one selected essence data is used for forming the first metadata. This is an essential help for the user to edit the first metadata. He does not have to look through the whole list of current metadata to find content-related further information. Instead of this, the user obtains a valuable hint to closely content correlated essence from the second metadata. Thus he does not have to go through the whole list of current metadata but highly relevant essence data are proposed automatically.

The at least first metadata may be formed by taking over the at least one selected essence into a MD-essence space of the metadata-template. This means, that the essence data or part of essence data are simply transferred to the metadata-template without any transformation.

The at least first metadata is advantageously formed by adding one or more MD-links of the second metadata into a MD-link space of the metadata-template. This means, that the MD-links are simply formed by transferring the MD-links from other metadata into the new metadata without transformation.

Third metadata and/or third essence data linked with MD-links of the second metadata may be used for forming the MD-essence and/or metadata-links of the first metadata. Therefore, a relation-chain of links having any length may be used to automatically propose a convenient metadata.

Fortunately, a forming or editing process of the metadata is performed with the help of a graphic user interface (GUI). Such a GUI represents a comfortable assistance tool for editing metadata.

BRIEF DESCRIPTION OF THE DRAWINGS

The present invention will now be described in more detail in connection with the attached drawings, showing in.

DETAILED DESCRIPTION OF PREFERRED EMBODIMENTS

For conversion of essence into metadata, essence data can be directly converted into MD-essence. The problem is how to conveniently generate a meaningful MD-link for it. To solve this problem, a basic and an advanced method are described in the following, which utilize the relationship between existing essence and metadata to generate a significant MD-link.

Figure 1:
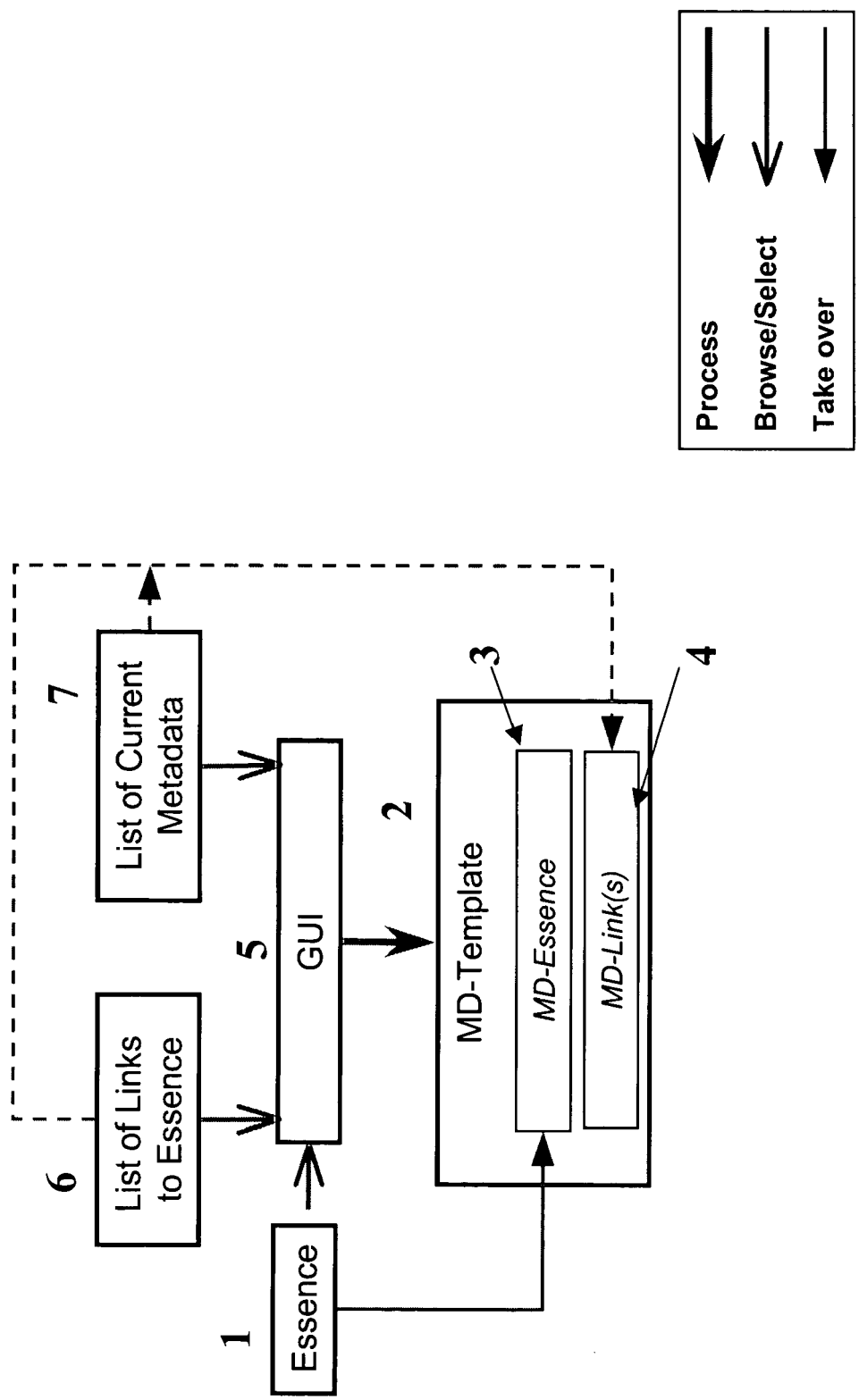
FIG. 1 a schedule for converting essence into metadata according to a basic method of the present invention.

A basic method, which converts an essence into metadata and utilizes other existing essence or metadata to set up metadata references is composed as following:

I. Basic Method:
 a) As shown in FIG. 1, the task of this basic method is to combine a selected essence 1 with a provided metadata template 2. The metadata template 2 includes a MD-essence 3 and MD-link(s) 4.

b) As further shown in FIG. 1, a graphic user interface (GUI) 5 can browse or operate the following components: the selected essence 1, the metadata template 2, a list of links to existing essences 6 and a list of current existing metadata 7.

c) Using a GUI 5 operation, the user may convert the selected essence 1 into metadata 2 through taking over essence 1 into MD-essence 3. The essence 1 can be a text, a picture (such as a thumbnail picture), an audio or a video-clip. If the MD-essence 3 contains a picture, an audio or a video clip, the metadata 2 is a kind of rich metadata.

d) After converting essence 1 into MD-essence 3, it still needs to generate the MD-link(s). Without MD-link(s) information, metadata are meaningless. In this basic method, the user may browse a list of links to existing essences 6 and a list of existing metadata 7 with the GUI 5. The user may select desired links to the present essence from the list of links to essence 6 and add the selected links to MD-link 4. Furthermore, the user may select metadata from the metadata list 7 and generate a link information to the selected metadata, and add the generated link to MD-link 4.

e) After above editing process, a new metadata is generated, which is based on the metadata template 2. Its MD-essence 3 is taken over from selected essence 1 and its MD-link(s) 4 is generated from list of links of existing essence 6 and metadata 7.

Figure 2:
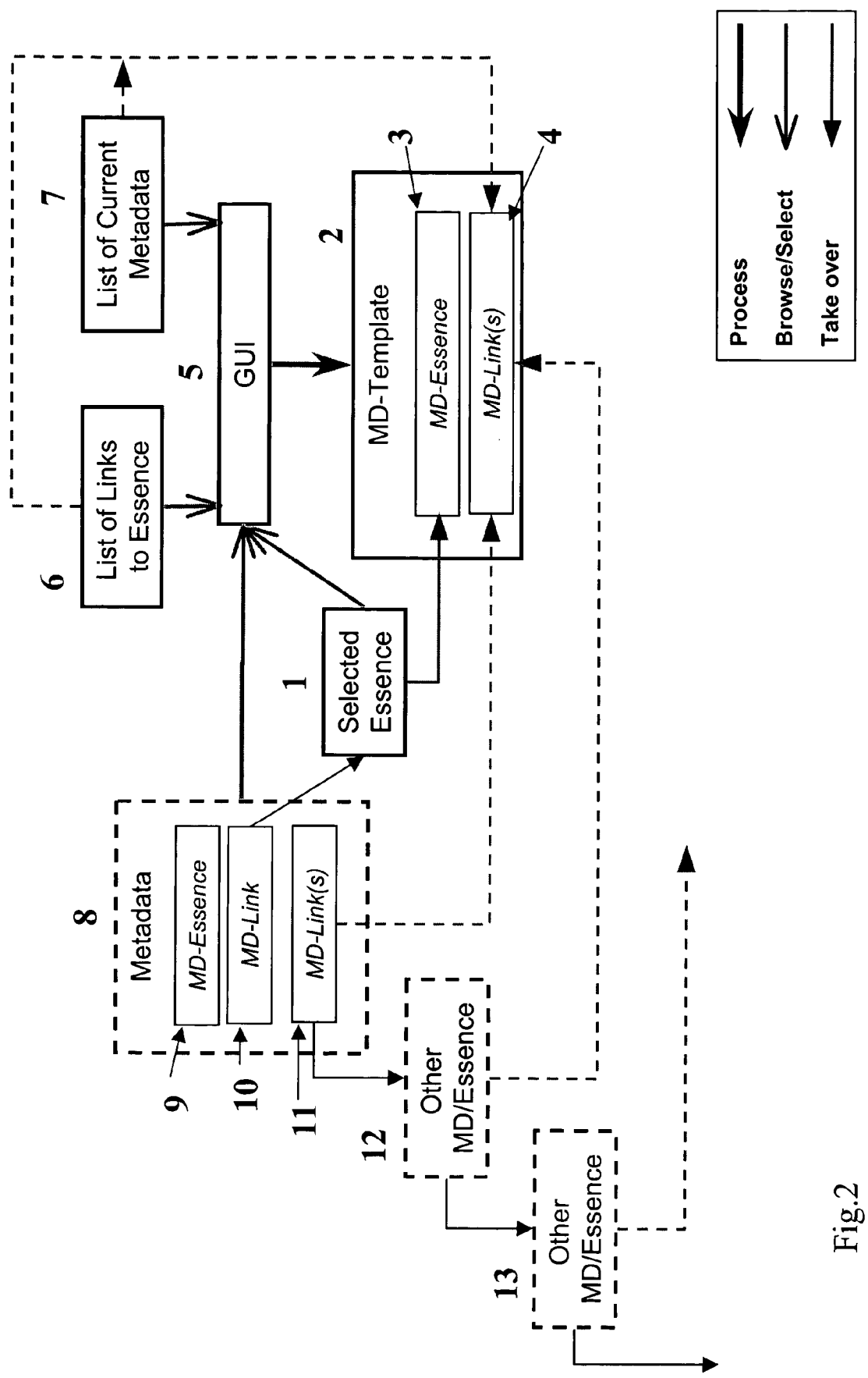
FIG. 2 a schedule for converting essence into metadata according to an advanced method of the present invention.

According to this basic method, a selected essence 1 is converted into a new metadata 2, wherein the user has to do most of the work of finding or generating the new MD-link(s) 4. The user must generate a metadata link according to his own pre-knowledge or understanding. He sets up MD-link 4 through selecting and generating a link message from existing essence and metadata. In this procedure, the user cannot use any assistant information to simplify his selection and judgment process. However, in a lot of cases it is difficult to generate efficient and correct MD-link by only using above basic method. Therefore, an advanced method is proposed here, which can make use of associated reference information to help the user to select efficient and significant MD-link(s) for the new metadata:

II. Advanced Method:

a) As shown in FIG. 2, the advanced method includes all functions and components of the basic method as described above in I. (a)-(e).

b) As alternative way to the basic method, in the advanced method, the user may search in a metadata database for all metadata 8, which are linked to the selected essence 1. The metadata 8 have their own MD-essences 9 and MD-links 10. Each MD-link 10 directs to essence 1.

c) The metadata 8 can be viewed and operated by GUI 5.

d) The MD-essence 9 of metadata 8 can be used as additional reference material for editing MD-essence 3 of metadata 2. For example, the user may take the MD-essence 9 to improve MD-essence 3.

e) The metadata 8 provides useful hints for users. Based on metadata 8, the user may generate improved reference link data for the new generated metadata 2. For example, besides MD-link 10, the metadata 8 may include an other MD-link 11, which links to another metadata or essence 12. Within metadata 8 all MD-links 10, 11 are content associated. Therefore, metadata/essence 12 and essence 1 are closely content-related entities. Thus, metadata/essence 12 is a good reference candidate for the new metadata 2. In this case, metadata 2 should have a reference link, which directs to the metadata/essence 12. If the user decides to take over the MD-link(s) 11 as reference link into metadata 2, he can simply add the MD-link(s) 11 to MD-link(s) of metadata 2.

f) Further, the user may make use of the hint of metadata 8 to find further content-related entities of essence 1, or reference link data of metadata 2. For example, the user may look for interested reference information in metadata/essence 12 and generate MD-link to metadata 2. Thereby the user may find other associated metadata/essence 13 and generate a possible MD-link for metadata 2 on the basis of metadata/essence 13.

g) The user completes all above steps under GUI 5 operation.

In FIG. 2. entities 1, 8, 12, 13 . . . form of a kind of relationship-hint-chain. This relationship-hint-chain makes it possible to let the user easily find out associated reference links for the new metadata 2. This is a fast way to get desired entities from hundreds and thousands of candidates.

The basic method and the advanced method for converting essence into metadata may be employed in parallel. If the user has enough pre-knowledge for generating reference link data, the user may use the basic method described above in (I), otherwise, the user may use the advanced method described in (II) and based on the relationship-hint-chain to generate a significant metadata link.

For better understanding of the above methods the following application examples are given:

1. A user will generate a new metadata based on an existing photo (essence 1). The content of the selected photo is about Eiffel tower in Paris. At first, the user will convert the photo into MD-essence 3. If the original photo has a big format, the new generated MD-essence photo can be converted into a shrunk formatted picture, such as a thumbnail photo. Now the user has a metadata with a MD-essence part. Second, the user must set up significant reference links for this metadata according to one of the two methods:

a) Based on the above described basic method, the user may browse lists of all existing essences or metadata and manually generate MD-links to preferred essences or metadata, such as a film about the Eiffel tower, a biographical article about the designer of the Eiffel tower, a metadata which includes many useful reference links about the Eiffel tower and Paris, etc. The problem for this method is that if there are a lot of possible candidate essences or metadata, it is difficult for the user to generate reference links correctly and quickly.

b) Based on the above described advanced method, the user does not need to browse all essences or metadata. The user only has to check existing metadata 8 which link to the selected Eiffel tower photo (essence 1). If there exists any metadata 8 which points to the selected photo, the user may simply check all reference links 11 of the metadata 8. The user may look for preferred entities following these reference links 11 and select interested references and set up MD-links 4 for the new created metadata 2. When using the advanced method, the user may set up the same MD-link 4 as the above basic method, such as links to some films, pictures or articles about Eiffel tower and Paris. However, the advanced method is more sufficient and faster in case of larger essence and metadata databases.

2. A user will generate a new metadata based on a movie (essence 1)—"The Lost World (Jurassic Park II)". The user may analyse the whole movie and extract some thumbnail pictures, a video-clip or an audio clip as key representative entity of the movie. After that the user may convert the thumbnail pictures, the video clip or the audio clip into a MD-essence 3 of the new metadata 2. For example, if the user converts a dinosaur picture into MD-essence 3 of the new metadata 2, he may use the advanced method to search for interested reference quickly from existing metadata, which points to the selected movie. By this way, the user may generate useful MD-links 4, for the new metadata 2, such as links to movies "Jurassic Park I", "Jurassic Park II", "Jurassic Park III", links to some dinosaur document movies or pictures or articles, as well as links to some metadata which contain summary links about a dinosaur topic.

As can be seen from the above examples, both methods provide a comfortable assistant tool for metadata editing.

What is claimed is:

1. A computer based method for processing multimedia data including the steps of:
   providing at least one selected essence data, wherein essence data represents information being directly perceptible by a user,
   providing a metadata template to be used to form at least a first metadata,
   providing at least one of a list of links to a plurality of second essence data and a list of a plurality of second metadata,
   determining at least one of: that at least one metadata link is a link and is in the list of links that points to said selected essence data and that at least one of the second metadata has a metadata link pointing to said selected essence data, and
   forming said at least first metadata on the basis of said at least one selected essence data and metadata associated with said determined metadata link by applying said metadata template.

2. Method according to claim 1, wherein said at least first metadata is formed by using in an MD-essence space of said metadata template metadata essence associated with said determined metadata link.

3. Method according to claim 1, wherein the determined metadata has at least one second metadata link, and wherein the first metadata is formed by adding said at least one second metadata link into an MD-link space of said metadata template.

4. Method according to claim 1, wherein the determined metadata has at least one second metadata link pointing to at least one third metadata, and wherein the third metadata is used for forming said first metadata.

5. Method according to claim 1, wherein the step of forming said at least first metadata is performed by a graphic user interface.

6. A computer based device for processing multimedia data comprising:
   a first storing means for providing at least one selected essence data, wherein essence data represents information being directly perceptible by a user,
   second storing means for providing a metadata-template to be used to form at least a first metadata,
   third storing means for providing at least one of a list of links to a plurality of second essence data and a list of a plurality of second metadata,
   first processing means connected to said first, second and third storing means for determining at least one of: said metadata link is in the list of links points to said selected essence data, and said at least one of the second metadata has a metadata link pointing to said selected essence data, and
   second processing means connected to said first, second and third storing means for forming said at least first metadata on the basis of said at least one selected essence data and metadata associated with said determined metadata link by applying said metadata template.

7. Device according to claim 6, wherein said at least first metadata is formable by using in an MD-essence space of said metadata template metadata essence associated with said determined metadata link.

8. Device according to claim 6, wherein the determined metadata has at least one second metadata link, and wherein the first metadata is formed by adding said at least one second metadata link into an MD-link space of said metadata template.

9. Device according to claim 6, wherein the determined metadata has at least one valid second metadata link pointing to at least one third metadata, and wherein the third metadata is used for forming said first metadata.

10. Device according to claim 6, further including a graphic user interface connected to said first and second processing means for forming said at least first metadata.

* * * * *